United States Patent [19] Bennett et al.

[11] 3,729,659

[45] Apr. 24, 1973

[54] MULTI-TERMINAL SEMICONDUCTOR DEVICES HAVING PRESSURE CONTACTS FOR MAIN AND GATE ELECTRODES

[75] Inventors: Roger Bennett; Anthony Peter Clelford, both of London, England

[73] Assignee: Westinghouse Brake English Electric Semi-Conductors Limited, London, England

[22] Filed: Oct. 29, 1971

[21] Appl. No.: 193,883

Related U.S. Application Data

[60] Continuation of Ser. No. 825,582, May 19, 1969, abandoned.

[30] Foreign Application Priority Data

June 18, 1968 Great Britain ..................28898/68

[52] U.S. Cl. ........317/234 R, 317/234 P, 317/234 W, 29/590, 174/52 S

[51] Int. Cl. ..............................H01l 3/00, H01l 5/00

[58] Field of Search .........................317/234, 5.2, 5.3, 317/5.4, 6, 11; 29/589, 590; 124/52 S

[56] References Cited

UNITED STATES PATENTS

| | | | |
|---|---|---|---|
| 3,293,510 | 12/1966 | Pfaffenberger | 317/234 |
| 3,299,327 | 1/1967 | Roach | 317/234 |
| 3,396,316 | 8/1968 | Wislocky | 317/234 |
| 3,463,976 | 8/1969 | Steinmetz | 317/234 |

FOREIGN PATENTS OR APPLICATIONS

| | | | |
|---|---|---|---|
| 1,031,233 | 6/1966 | Great Britain | 317/234 |
| 1,078,342 | 8/1967 | Great Britain | 317/234 |
| 1,329,372 | 4/1963 | France | 317/234 |

*Primary Examiner*—John W. Huckert
*Assistant Examiner*—Andrew J. James
*Attorney*—Ross F. Hunt Jr. et al.

[57] ABSTRACT

A multi-terminal semiconductor device is provided which includes a housing for encapsulating a semiconductor element and having a base portion which serves as one of a pair of main current terminals and contacts a first zone of the element. Main and auxiliary contact assemblies provide electrical connections between the second of the main terminals and a second zone of the element, and an auxiliary control current contact and a third zone of the element, respectively, the third zone being located peripherally of the second zone. A main compression loading device such as a spring washer acting against the housing urges a main contact against the second zone whereas an auxiliary compression loading device disposed within the periphery of the main loading device acts through an insulator and between the two assemblies to urge an auxiliary contact against the third zone.

16 Claims, 9 Drawing Figures

MULTI-TERMINAL SEMICONDUCTOR DEVICES HAVING PRESSURE CONTACTS FOR MAIN AND GATE ELECTRODES

This is a continuation, of application Ser. No. 825,582 filed May 19,1969 now abandoned.

This invention relates to multi-terminal semiconductor devices.

The base portion may constitute a third terminal of the device.

The second or auxiliary contact may have a central portion from which depends a peripheral flange portion the free end of which remote from the central portion constitutes the extremity engaging the third zone. In this case, the central portion may have therethrough an aperture by which the second contact is located with respect to an insulating bush surrounding the first or main contact.

The bush may provide a shoulder between which and the central portion of the second contact is located means by which the extremity is resiliently urged into electrical connection with the third zone. With such an arrangement, the bush may serve as a transmission means through which is transmitted a force by which the first contact member is resiliently urged into electrical connection with the second zone. Said force may be generated by resilient means located between that side of the bush which is remote from the second contact member and a bearing surface on a part of the housing. Both of the resilient means may be constituted by a stack of belleville washers.

In an alternative arrangement, the second contact may have a portion thereof which is itself resilient and which constitutes the means by which the extremity of the second contact member is resiliently urged into electrical connection with the third zone. Said portion may be intermediate a central portion by which the second contact is located with respect to the first contact and a dependant portion the free end of which constitutes the extremity resiliently urged into electrical connection with the third zone. With such an arrangement, there may be provided two such resilient portions intermediate which is the central portion and from each of which depends a dependant portion the extremity of the free end of each of which makes electrical connection with the third zone. Each resilient portion may be encircled by a sleeve of insulating material. The central portion maybe engaged with a connection which passes through and is electrically insulated from the first contact member. The connection may pass through the central portion of the second contact member and may pass through an insulating bush accomodated in a bore in the first contact member. The connection may have a head located between the central portion and an insulated washer which is located between the head and the element. The bore in the first contact member may also accommodate spring means resiliently urging, through the insulating bush, the central portion into engagement with the head, the head into engagement with the insulating washer, and the washer into engagement with the element.

Embodiments of the present invention will now be described in greater detail, by way of example only, with reference to the accompanying drawings of which:

Figures 1, 2, 8, 9:
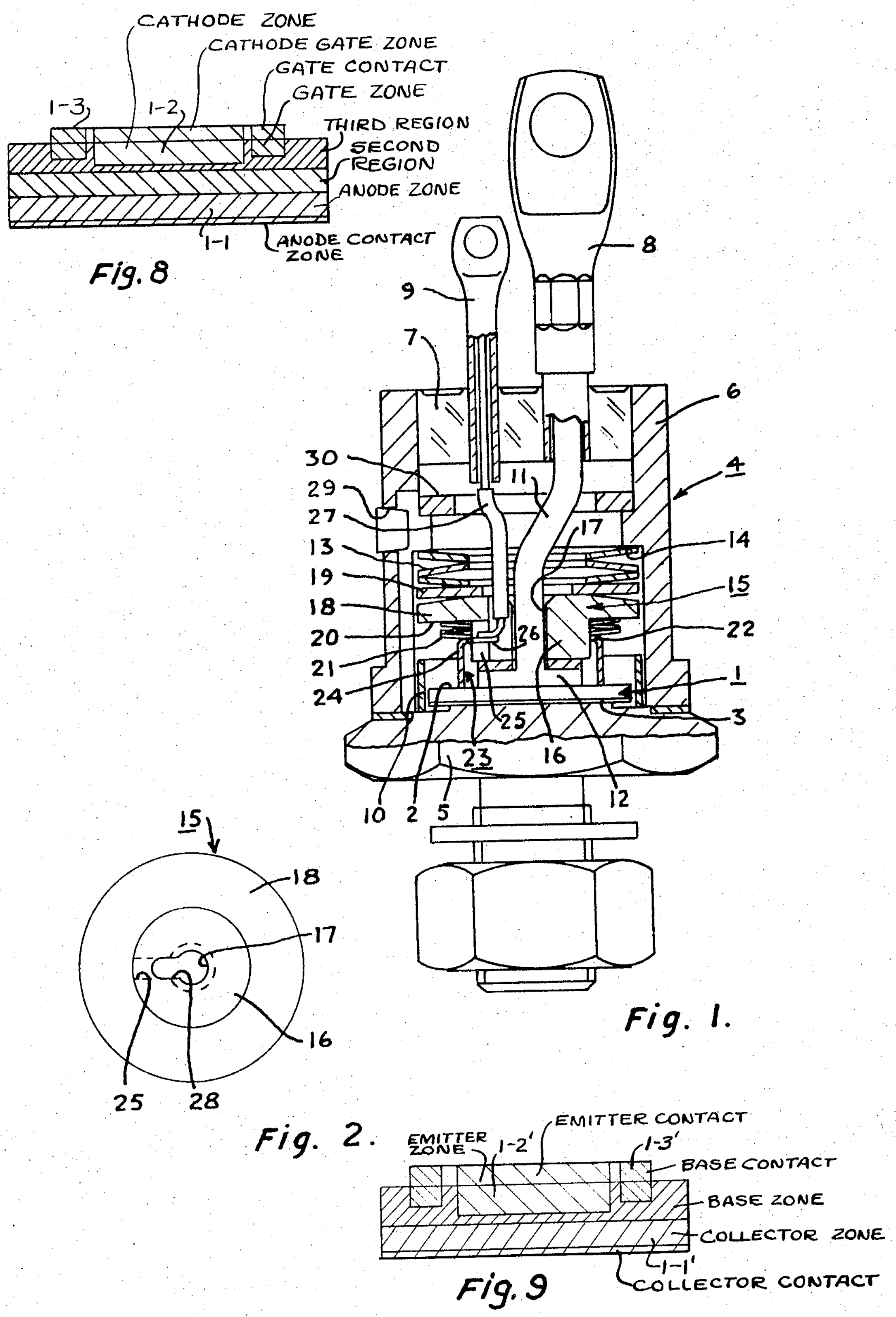
FIG. 1 is a cross-sectional view of one embodiment.
FIG. 2 is a plan view of a component of the embodiment of FIG. 1.

FIG. 1 shows a three-terminal semiconductor device having a semiconductor element one which is of conventional wafer-form and is of silicon semiconductor material. The element 1 has opposed faces 2 and 3. From the face 3 there extends inwardly of the element 1 a first zone (denoted 1—1 in FIG. 8 and 1.1′ in FIG. 9 and from the face 2 there extends inwardly of the element from the central portion of the face 2 a second zone (1–2 in FIG. 8, 1–2′ in FIG. 9) and a third zone (1–3 in FIG. 8, 1–3′ in FIG. 9) having a contact which encircles the second zone.

FIG. 8 shows a typical element containing a thyristor in which the first zone is the anode, the second the cathode and the third the gate. FIG. 9 shows, similarly, a transistor element with the first zone the collector, the second zone the emitter and the third zone the base.

The element 1 is encapsulated in a housing 4 on a base portion 5 on which the element 1 is mounted with the face 3 in engagement with the base portion 5, the base portion 5 constituting an anode terminal with which the anode contact of the element 1 is in electrical-conducting and heat-conducting relationship. The housing 4 is further constituted by a steel tubular part 6 sealed at its lower end to the base portion 5 and closed at its upper end by a glass seal 7 through which extend an anode terminal 8 and a gate terminal 9.

The periphery of the element 1 is encircled by a metallic sleeve 10 to locate the element 1 relative to housing 4.

Connected to the cathode terminal 8 by lead 11 is a contact 12 resiliently engaged with the cathode zone of the element 1 by a stack of Belleville washers 13 compressed between a shoulder 14 on the tubular part 6 of the housing 4 and an insulating bush 15 shown in plan view in FIG. 2.

The bush 15 has a central portion 16 through which extends a bore 17 through which passes the lead 11.

The bush 15 has a peripheral outwardly extending flange 18 against the upper side of which abuts a washer 19 located between the stack of Belleville washers 13 and the bush 15 and the under side of which provides a shoulder 20 against which bears the upper end of a second stack of Belleville washers 21.

The lower end of the stack of Belleville washers 21 bears against a central portion 22 of a contact member 23 from the central portion 22 of which depends a peripheral flange portion 24 the extremity of the free end of which is resiliently urged by the stack of Belleville washers 21 into electrical engagement with the third zone of the element 1.

Extending inwardly through a slot 25 in the bush 15 from the central portion 22 of the contact 23 is a tag 26 to which is soldered a lead 27 which passes upwardly through an extension 28 of the bore 17 in the bush 15 to the terminal 9.

Extending through the part 6 of the housing 4 is a plugged aperture 29 which, prior to plugging, was the means by which the interior of the housing 4 was exhausted.

To ensure complete elimination of any dampness inside the housing 4, the housing supports a desiccant ring 30.

Turning now to the embodiment of FIGS. 3 to 7, the components here shown are shown on an enlarged scale for the sake of clarity and, for similar reason, many of the parts of this embodiment have been omitted from the drawing.

In these Figures, the element 1 again has the opposed faces 2 and 3 and, although as in FIG. 1 they are not shown, the element 1 is provided with a similar arrangement of zones.

Again, as in the embodiment of FIG. 1, the element 1 is mounting on a base portion of an encapsulating housing. The base portion similarly provides the base terminal on which the element 1 is mounted in electrical-conducting and heat-conduct relationship.

In the embodiment, the cathode contact 12 (see FIGS. 3, 4 and 5) has a tubular portion 41 with, at its lower end, a peripheral outwardly-extending flange portion 42 including a diametrical slot at 43.

The lower face 44 of the flange 42 electrically engages the central cathode zone of the element 1 and the upper face 45 provides a support for an insulating washer 19' between which and a shoulder on the encapsulating housing extends a stack of Belleville washers 13' by means of which the face 44 of the contact 12 is resiliently engaged with the anode zone of the element 1.

Secured to the upper end of the tubular portion 41 is a lead 11 connected to an cathode terminal secured to the housing.

The tubular portion portion 41 is provided with a bore 46 which accommodates a compression spring 47 the upper end of which bears against a shoulder 48 from which extends through the remainder of the portion 41 a bore 46*a* of reduced diameter as compared to the bore 46, and the lower end of the spring 47 bears against a bush 49 of insulating material.

Figures 3, 4, 5, 6, 7:
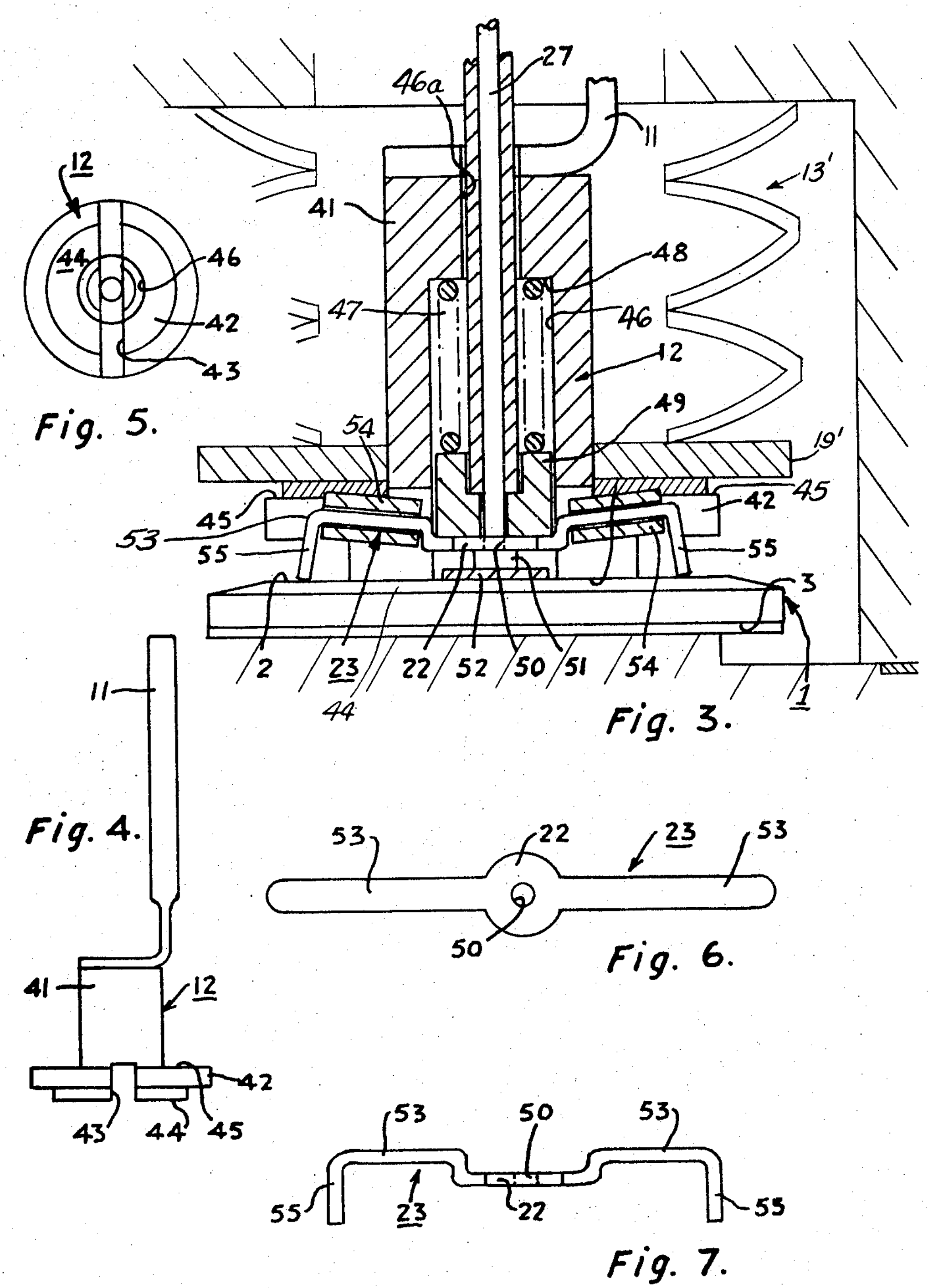
FIG. 3 is a cross-sectional view of certain of the components of an alternative embodiment.
FIGS. 4 to 7 are various views of some of the components of the embodiment of FIG. 3, and, FIGS. 8 and 9 respectively illustrate four- and three-zone embodiments of the semiconductor element itself.

The bush 49 is caused by the spring 47 to bear against a central portion 22 of a gate contact 23 (see FIGS. 3, 6 and 7). This central portion 22 has therethrough a bore 50 through which passes a lead 27 connecting a gate terminal of the device with a head 51 trapped by the compression of the spring 47 between the lower side of the central portion 22 of the contact 23 and an insulating washer 52 which electrically insulates the lead 51 from the central zone of the element 1.

It will be seen that by the arrangements so far described, the contact 23 is housed in and is located with respect to the contact 12.

Extending outwardly from the central portion 22 of the contact 23 is a pair of opposed resilient arms 53 shown in FIG. 7 in their undeformed condition and, in FIG. 3 in the position they have when resiliently deflected with respect to the central portion 22.

These arms 53 extend through the slot 43 in the first contact 12 and are encircled each by an insulating sleeve 54.

Depending from the free end of each resilient arm 53 is a downwardly directed portion 55 the extremity of the free end of which engages the third zone in the element 1.

Having thus described our invention what we claim is:

1. A multi-terminal semiconductor device comprising a housing having a base portion and encapsulating a semiconductor element mounted on said base portion, said housing supporting first, second and third main current terminals, said semiconductor element including first, second and third zones, each of distinct conductivity type as compared with the adjacent portion of said element, said first zone extending inwardly of the element from one of two opposite faces of said element, said one face being mounted in electrical-conducting and heat-conducting relationship with said base portion and said base portion forming said first terminal, said second zone and said third zone extending inwardly from the other of said opposite surfaces, and said third zone being located outwardly of the outer periphery of said second zone, said device further including second contact means within said housing for making electrical connection between said second zone and said second terminal and third contact means for making electrical connection between said third zone and said third terminal of the device, said third contact means includes a central portion and a peripheral flange portion depending from said central portion, the free end of said flange portion remote from the central portion engaging said third zone, main compression loading means acting against said housing to urge an electrical contact of said second contact means against said second zone, an insulator, and an auxiliary compression loading means, disposed within the outer periphery of said main compression loading means in symmetrical relationship thereto, acting between said insulator and an electrical contact of said third contact means to urge said electrical contact of said third contact means against said third zone.

2. A semiconductor device as claimed in claim 20 wherein said insulator comprises an insulating bushing and said central portion includes an aperture therein for locating said electrical contact of said third contact means with respect to the insulating bushing.

3. A semiconductor device as claimed in claim 2 wherein said insulating bushing includes a shoulder portion and said auxiliary compression loading means comprises resilient means located between the central portion of said electrical contact of said third contact means and said shoulder portion of said insulating bushing for resiliently urging the said free end of said flange portion of said electrical contact of said third contact means into electrical connection with said third zone.

4. A semiconductor device as claimed in claim 3 wherein said bushing serves as a transmission means through which is transmitted a force generated by said main compression loading means by which said second contact means is resiliently urged into electrical connection with said second zone.

5. A semiconductor device as claimed in claim 4 wherein said main compression loading means comprises further resilient means located between the side of said bushing remote from electrical contact of said third contact means and a bearing surface formed in said housing.

6. A semiconductor device as claimed in claim 5 wherein the first mentioned resilient means and said further resilient means are both formed by a stack of spring washers.

7. A semiconductor device as claimed in claim 1 wherein said auxiliary compression loading means includes a resilient portion of said third contact means for resiliently urging an extremity of the electrical contact of said third contact means into electrical connection with said third zone.

8. A semiconductor device as claimed in claim 7, wherein said electrical contact of said third contact means further includes a central portion for locating said electrical contact of the third contact means with respect to said main contact and wherein said electrical contact of said third contact means is formed by a further portion of said third contact means dependent from said resilient portion and having a free end which constitutes the said extremity resiliently urged into electrical connection with said third zone.

9. A semiconductor device as claimed in claim 1 wherein said third contact means includes first and second of said resilient portions constituting said auxiliary compression loading means, a central portion, and first and second dependent portions which respectively depend from said resilient portions and constitute said electrical contact of said third contact means, the free ends of said dependent portions making electrical connection with said third zone.

10. A semiconductor device as claimed in claim 8 further comprising a sleeve of insulating material surrounding each said resilient portion.

11. A semiconductor device as claimed in claim 7 further comprising a connection in engagement with said third contact means, said connection passing through said the electrical contact of said second contact means and said device including means for electrically insulating said connection from said second contact means.

12. A semiconductor device as claimed in claim 11 wherein the electrical contact of said third contact means includes a central portion having a bore therein through which said connection passes.

13. A semiconductor device as claimed in claim 12 wherein said means for electrically insulating said connection from said second contact comprises an insulating bushing accommodated in a bore in the electrical contact of said second contact means, said bushing having a bore through which said connection passes.

14. A semiconductor device as claimed in claim 11 wherein said connection includes a head located between the central portion of the electrical contact of said third contact means and an insulating spacer located between said head and said semiconductor element.

15. A semiconductor device as claimed in claim 13 further comprising spring means located within the bore in said first contact for resiliently urging, through said insulating bush, said central portion of the electrical contact of said third contact means into engagement with said head, said head into engagement with said insulating spacer, and said spacer into engagement with said semiconductor element.

16. A semiconductor device as claimed in claim 7 wherein said auxiliary compression loading means includes a resilient portion of a central portion of said third contact means.

* * * * *